(12) United States Patent
Kim et al.

(10) Patent No.: US 12,008,029 B1
(45) Date of Patent: Jun. 11, 2024

(54) DELIMITER DETERMINATION IN INPUT DATA

(71) Applicant: TERADATA US, INC., San Diego, CA (US)

(72) Inventors: Sung Jin Kim, Buena Park, CA (US); Yinuo Zhang, Los Angeles, CA (US); Rehana Rahiman, San Diego, CA (US); Eugene Szedenits, Ypsilanti, MI (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/147,851

(22) Filed: Dec. 29, 2022

(51) Int. Cl.
*G06F 16/00* (2019.01)
*G06F 16/38* (2019.01)

(52) U.S. Cl.
CPC .................. *G06F 16/38* (2019.01)

(58) Field of Classification Search
CPC ....................................... G06F 16/38
See application file for complete search history.

(56) References Cited

U.S. PATENT DOCUMENTS

2018/0314883 A1* 11/2018 Saurav ............... G06F 18/24
2023/0143568 A1* 5/2023 Asok .................. G06F 40/151
704/9

OTHER PUBLICATIONS

Yinuo Zhang, U.S. Appl. No. 18/147,855 entitled Processing of Delimiter-Separated Value (DSV) Data filed Dec. 29, 2022 (65 pages).
ASCII / ISO 8859-1 (Latin-1) Table with HTMLEntity Names downloaded Dec. 18, 2022 (10 pages).
Project Nayuki, What are binary and text files? downloaded Dec. 18, 2022 (4 pages).
Chris Warrick, CSV is not a standard, Apr. 7, 2017 (3 pages).
Wikipedia, Delimiter-separated values last edited Nov. 16, 2022 (3 pages).
Wikipedia, International Components for Unicode last edited Dec. 6, 2022 (4 pages).
J. Stolfi, ISO-8859-1 (ISO Latin 1) Character Encoding downloaded Dec. 18, 2022 (5 pages).
PYTHON-CSV Module, CSV File Reading and Writing downloaded Dec. 18, 2022 (9 pages).
Wikipedia, UTF-8 last edited Dec. 18, 2022 (22 pages).
Wikipedia, UTF-16 last edited Nov. 30, 2022 (10 pages).

* cited by examiner

*Primary Examiner* — Jared M Bibbee
(74) *Attorney, Agent, or Firm* — Trop, Pruner & Hu

(57) ABSTRACT

In some examples, a system performs a delimiter identification process that includes identifying candidate record delimiters and candidate field delimiters in the input data, and providing different pairs of candidate record delimiters and candidate field delimiters. For each respective pair of the different pairs, the system identifies records using the corresponding candidate record delimiter of the respective pair, and computes a collection of measures including a measure indicating a quantity of unique fields observed in the records identified using the corresponding field delimiter of the respective pair. The system selects, based on values of the collection of measures computed for corresponding pairs of the different pairs, a record delimiter and a field delimiter in a pair of the different pairs.

20 Claims, 8 Drawing Sheets

DELIMITER DETERMINATION IN INPUT DATA

BACKGROUND

Data can be provided from one or more data sources in various different formats. In some examples, data of different formats can be provided to an analytic system for processing. It can be challenging to reliably determine a format of input data so that the analytic system can process the input data without errors.

BRIEF DESCRIPTION OF THE DRAWINGS

Some implementations of the present disclosure are described with respect to the following figures.

Figure 1:
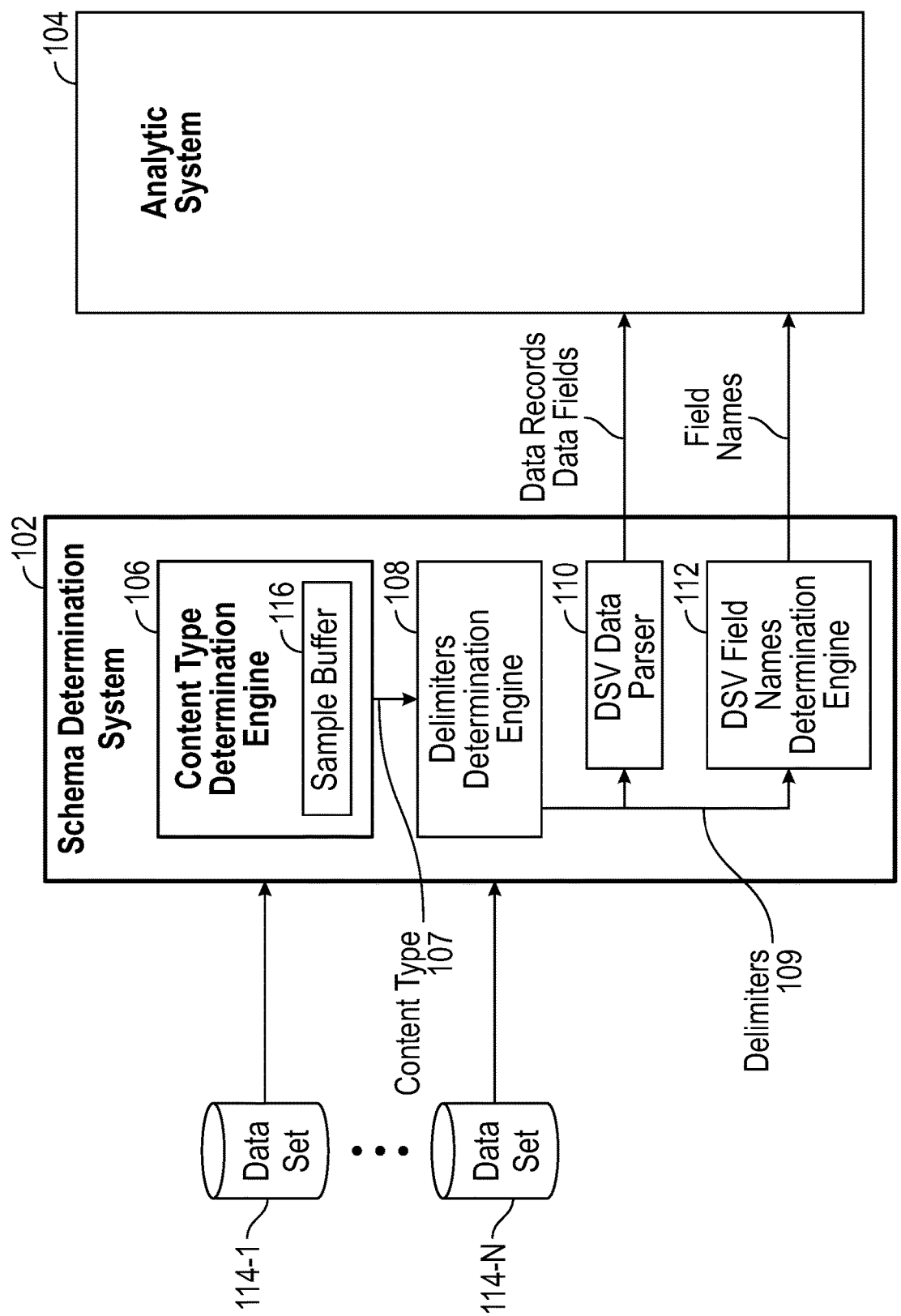
FIG. 1 is a block diagram of an example arrangement that includes a schema determination system and an analytic system, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "format" of data can refer to how the data is arranged. For example, data can be in the form of binary data or text data. As further examples, data can be arranged according to any of various specifications, whether standardized, open source, or proprietary. Various examples of different formats are discussed further below.

To process data that may possibly be in different formats, techniques are provided to determine how the data is represented. Examples of analytic systems that can process data can include any or some combination of the following: a database management system (DBMS) that stores data in relational tables and responds to database queries by reading, writing, joining, sorting, and/or performing other database operations on the data; a data mining system to identify characteristics in the data (e.g., patterns, correlations, anomalies, etc.), a machine learning system to that can be applied on data to produce a predicted output, and/or other types of systems that are able to perform operations with respect to data.

Without the ability to distinguish between different formats of data, an analytic system would not be able to successfully process the data. For example, the analytic system may have to distinguish between binary data and text data. Binary data is made up of a series of bytes. The content of binary data can be interpreted by a program or a hardware processor specifically configured to understand the content of the binary data. Various examples of binary data can include image data, video data, audio data, archive data, database data, executable data, data according to various document formats (e.g., PDF, EXCEL, POWERPOINT, WORD, etc.), or other binary formats. Data in a binary format can be interpreted by a program or hardware processor configured to process such binary data, and cannot be interpreted by other programs or other hardware processors.

Text data can store human readable characters using values that represent respective characters, such as alphanumeric characters, symbols, and so forth. As examples, values for representing characters can include American Standard Code for Information Interchange (ASCII) code values. Examples of text data can include delimiter-separated value (DSV) data (in which data fields are separated by delimiters), web data such as data according to a markup language (e.g., a Hypertext Markup Language (HTML), an Extensible Markup Language (XML), etc.), JavaScript Object Notation (JSON) data, and so forth.

Text data containing delimiter-separated values can be referred to as DSV data. DSV data contains values that are separated by delimiters, where a delimiter can be any of various delimiter characters.

If reliable mechanisms are not provided to distinguish between data of different formats and to obtain data values in input data (including DSV data values), then analytic systems may produce errors when processing the input data.

FIG. 1 is a block diagram of an example arrangement that includes a schema determination system 102 and an analytic system 104, according to some examples. The analytic system 104 can include a DBMS, for example, or another type of analytic system. Although FIG. 1 shows the schema determination system 102 as being separate from the analytic system 104, in other examples, the schema determination system 102 can be part of the analytic system 104. Also, the schema determination system 102 may provide results of its schema determination to multiple analytic systems.

A "system" can refer to a computer or an arrangement of multiple computers. "Schema determination" can refer to a process of determining a type of content in input data and extracting data values from the input data. The schema determination system 102 includes a content type determination engine 106, a delimiters determination engine 108, a DSV data parser 110, and a DSV field names determination engine 112. In other examples, at least some of the content type determination engine 106, the delimiters determination engine 108, the DSV data parser 110, and the DSV field names determination engine 112 can be in separate system(s). Also, although shown as separate blocks, some or all of the content type determination engine 106, the delimiters determination engine 108, the DSV data parser 110, and the DSV field names determination engine 112 can be combined into one engine.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The schema determination system 102 receives input data including data of one or more data sets 114-1 to 114-N (N≥1). The one or more data sets 114-1 to 114-N can be provided from various data sources, which may be connected directly and/or coupled over a network to the schema determination system 102.

The content type determination engine 106 can determine a content type 107 of the input data. The content type 107 can include any or some combination of the following: a storage type of the input data, a character set of the input data, and a logical data model of the input data.

The content type determination engine 106 can distinguish between different storage types: (1) binary data, and (2) text data. In addition to being able to determine the storage type of the input data, the content type determination engine 106 according to some examples can also determine the character set of the input data. Examples of character sets include any or some combination of the following: Unicode Transformation Format 8 (UTF8), UTF16 (Big Endian or Little Endian), LATIN1 character set, and so forth. The determination of the character set allows for the analytic system 104 to perform processing of characters in the input data, including, for example, data comparison and search.

The content type determination engine 106 in some examples can also determine the logical data model of the input data. Examples of logical data models include a DSV logical model, a JSON logical model, an XML logical model, and so forth.

Assuming that the input data is according to the DSV logical model, the delimiters determination engine 108 can determine delimiters 109 in the input data. DSV data includes records and fields. Record delimiters are used to divide the DSV data into records. A record can include a row in the DSV data or a portion of a row. More generally, a record refers to a partition of the DSV data that is indicated by a record delimiter. Each record includes fields identified by field delimiters. Within a record, one or more field delimiters can identify respective two or more fields in the record. Each "field" in a record is used to contain a respective data value. The delimiters determination engine 108 is able to identify record delimiters and field delimiters in the input data.

The record delimiters and field delimiters are provided as the delimiters 109 to the DSV data parser 110 and the DSV field names determination engine 112. The tasks of the DSV data parser 110 and the DSV field names determination engine 112 are discussed further below.

Figure 2:
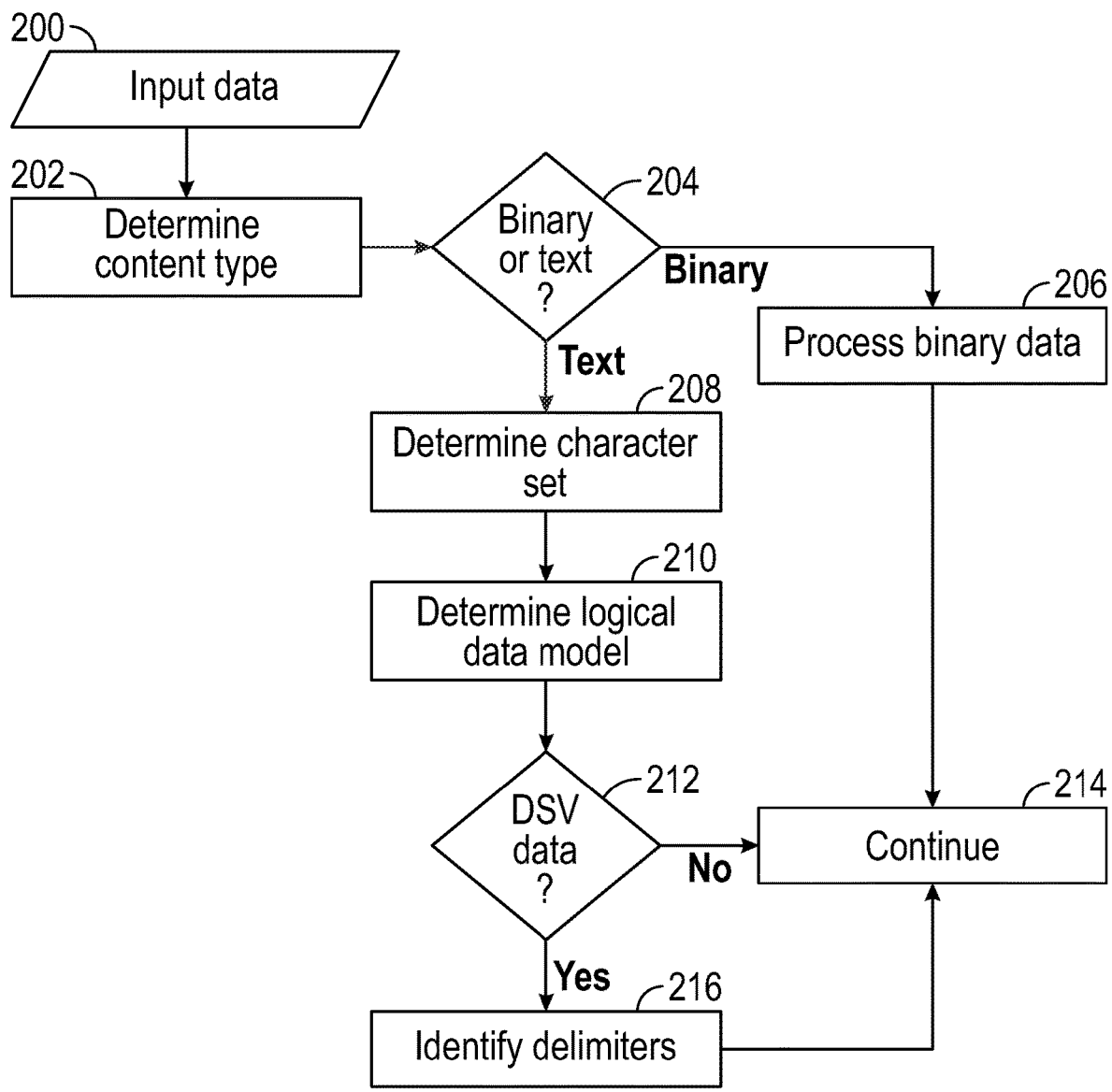
FIG. 2 is a flow diagram of an example process of content type determination and delimiter determination, according to some implementations of the present disclosure.

FIG. 2 is a flow diagram of an example process of the content type determination engine 106 and the delimiters determination engine 108. The content type determination engine 106 determines (at 202) the storage type of input data 200. The content type determination engine 106 determines (at 204) whether the storage type of the input data 200 is binary data or text data. If the storage type of the input data 200 is binary data, the content type determination engine 106 performs processing (at 206) of binary data.

However, if the storage type of the input data 200 is text data, the content type determination engine 106 determines (at 208) the character set of the input data 200. The content type determination engine 106 further determines (at 210) the logical data model of the input data 200. Further details relating to determining the storage type, the character set, and the logical data model of the input data 200 are discussed further below.

The content type determination engine 206 provides an indication of the determined content type 107 to the delimiters determination engine 108. The delimiters determination engine 108 determines (at 212) whether the input data 200 is DSV data. If not, the process of FIG. 2 continues (at 214). However, if the input data 200 is DSV data, the delimiters determination engine 108 identifies (at 216) delimiters (including record delimiters and field delimiters are) in the input data 200.

Determining Storage Type

This section describes example techniques of determining the storage type (binary data or text data) of input data (as determined at 202 and 204 in FIG. 2) by the content type determination engine 106 according to some examples.

As depicted in FIG. 1, the content type determination engine 106 includes a sample buffer 116 to store a sample of input data whose storage type is to be determined. A "buffer" can refer to a storage element, such as a memory or a portion of memory, a register or a portion of a register, and so forth. Examples of memories can include a dynamic random access memory (DRAM), a static random access memory (SRAM), a flash memory, and so forth. The sample buffer 116 is to store a portion (less than the entirety) of the input data so that the storage type is determined based on the portion, rather than the entirety, of the input data. In this way, the storage type can be determined without having to process a large amount of data which improves processing efficiency and also reduces the burden on other resources of the schema determination system 102, such as storage resources, communication resources, program resources, and so forth.

In some examples, to determine whether the input data is binary data or text data, the content type determination engine 106 scans the sample buffer 116 and collects the following statistics:

1) Frequencies of byte values (e.g., frequency of byte value 0x00, frequency of byte value 0x01, . . . , frequency of byte value 0xFF). The frequency of a byte value, b, is denoted as Freq[b]. A "frequency" of a byte value refers to a quantity representing how many times the byte value appears in the data sample contained in the sample buffer 116. Note that there are 256 possible different byte values in total, and each byte value can represent a respective character in the input data. A "character" can refer to an alphanumeric character, a symbol, or any other character that can appear in text data. In some examples, the byte values are ASCII code values.

2) Frequency (NumCtrlChar) of ASCII control characters (byte values in the range between decimal values 0 through 31).

3) Frequency (NumHighBitChar) of ASCII high bit characters (byte values in the range between decimal values 128 through 255). In some examples, the ASCII high bit characters represented by byte values in the range between decimal values 128 through 255 are special characters, such as graphics elements, etc., that are more likely to appear in binary data.

Once the above frequencies are collected, the likelihood that the data set is binary data is indicated using PDB (Possible Binary Data), which is computed according to Eq. 1 below.

$$PBD=(NumCtrlChar+NumHighBitChar-(Freq[\backslash t]+ Freq[\backslash r]+Freq[\backslash n]+Freq[0]). \quad (Eq. 1)$$

In Eq. 1, Freq[\t] represents a frequency of a tab control character (where \t is a byte value that represents the tab control character), Freq [\r] represents a frequency of a carriage return control character (where is a byte value that represents the carriage control character), Freq[\n] represents a frequency of a new line character (where \n is a byte value that represents a line feed control character), and Freq [0] represents a frequency of a null value.

Effectively, PDB is based on the frequencies (e.g., counts) of the non-text byte values (e.g., those in the range between decimal values 1-31 and 128-256 as represented by NumCtrlChar and NumHighBitChar, respectively), and subtract frequencies (e.g., counts) of control characters that may appear in text, namely tab, carriage return, and line feed, as represented by Freq[\t], Freq[\r], and Freq[\n], respectively. The content type determination engine 106 also subtracts the frequency (e.g., count) of null values since null values may be frequently found in 16-bit text data.

If PDB>Threshold*(Sample_size−Freq[0]), the content type determination engine 106 marks the input data as being binary data; otherwise, the content type determination engine 106 marks the input data as being text data. Sample_size represents the size (e.g., in bytes) of the data portion in the sample buffer 116, and Threshold is a predefined threshold value (e.g., ⅓ or another fractional value). If the value of PDB is at least ⅓ (or another fraction) of the total quantity of non-null byte values in the sample buffer 116 (as represented by Sample_size−Freq[0]), then the content type determination engine 106 marks the input data as binary data. On the other hand, if PDB is not greater than Sample_size−Freq[0], the content type determination engine 106 marks the input data as text data.

The determination of whether the input data is binary data or text data uses a heuristic approach based on frequencies of certain byte values (e.g., ASCII code values) in the input data. By using such a heuristic approach, a sophisticated analysis (which can be resource intensive) of input data to distinguish between binary data and text data would not have to be employed.

In other examples, the content type determination engine 106 can use other techniques for distinguishing between binary data and text data, such as by analyzing the input data to determine a distribution of byte values (e.g., ASCII code values) in the input data.

Determining Delimiters

This section describes example techniques of identifying record delimiters and field delimiters in input DSV data (task 216 in FIG. 2) performed by the delimiters determination engine 108 according to some examples. If the indication of content type 107 indicates that the input data is DSV data, the delimiters determination engine 108 performs the identification of delimiters.

The input DSV data is denoted as D. In some examples of the present disclosure, the delimiters determination engine 108 considers two factors when identifying which characters in the DSV data D are record delimiters and field delimiters: (1) frequency of candidate delimiters, and (2) consistency in quantities of fields in respective records.

The frequency of a character (which is a candidate delimiter) refers to how many times the character shows up in D.

The consistency of candidate delimiters refers to how close quantities of fields in respective records are relative to one another, if D is delimited by those candidate delimiters.

In an example, it is assumed that D includes:

state, city, temperature; CA, LA, 80.2; CA, SD, 82.5; CA, SF, 75.3

The delimiters determination engine 108 performs a delimiter identification process to identify the record delimiter and field delimiter in the example data D. In D, the following are the possible characters that can be record delimiters and field delimiters: ",", ";", "."

In this example, five candidate pairs of record delimiters and field delimiters can be considered (Case 1 to Case 5 below).

In Case 1, a first pair includes a semicolon character (";") as a candidate record delimiter, and a comma character (",") as a candidate field delimiter. In Case 1, D is decomposed into the following four records:

state, city, temperature;
CA, LA, 80.2;
CA, SD, 82.5;
CA, SF, 75.3

In the foregoing four records identified using the semicolon character as the candidate record delimiter, each record includes three fields identified using the comma character as the candidate field delimiter. In this example, each of the four records has three fields. In Case 1, the quantity of fields is consistent across records since all records have three fields.

In Case 2, a second pair includes a semicolon character (";") as a candidate record delimiter, and a period character (".") as a candidate field delimiter. In Case 2, D is decomposed into the following four records:

state, city, temperature;
CA, LA, 80.2;
CA, SD, 82.5;
CA, SF, 75.3

In the foregoing example, the first record ("state, city, temperature") has one field, but the other records each has two fields. For example, the second record ("CA, LA, 80.2") has two fields: a first field including "CA, LA, 80" and a second field including "2". In Case 2, there is some inconsistency in the quantities of fields in the records.

In Case 3, a third pair includes a period character (".") as a candidate record delimiter, and a semicolon character (";") as a candidate field delimiter. In Case 3, D is decomposed into the following four records:

state, city, temperature; CA, LA, 80.
2; CA, SD, 82.
5; CA, SF, 75.
3

In this example, the first three records have two fields, but the fourth record has one field. For example, the first record ("state, city, temperature; CA, LA, 80") has a first field "state, city, temperature" and a second field "CA, LA, 80". The second record ("2; CA, SD, 82") has a first field "2" and a second field "CA, SD, 82". The fourth record ("3") has one field.

In Case 4, a fourth pair includes a period character (".") as a candidate record delimiter, and a comma character (",") as a candidate field delimiter. In Case 4, D is decomposed into the following four records:

state, city, temperature; CA, LA, 80.
2; CA, SD, 82.
5; CA, SF, 75.
3

In this example, the first record ("state, city, temperature; CA, LA, 80") has five fields ("state", "city", "temperature": CA", "LA" "80"), the second and third records each has three fields (e.g., the third record "5; CA, SF, 75" has three fields "5; CA", "SF", "75"), and the fourth record has one field ("3"). In Case 4, there is more inconsistency in the quantities of fields in the records than in each of Case 2 and Case 3.

In Case 5, a fifth pair includes a comma character (",") as a candidate record delimiter, and a semicolon character (";") as a candidate field delimiter. In Case 5, D is decomposed into the following nine records:
state,
city,
temperature; CA,
LA,
80.2; CA,
SD, 82.5; CA,
SF,
75.3

Each of the third, fifth, and seventh records have two fields, and the other records each has one field.

For each pair of a corresponding candidate record delimiter and a corresponding candidate field delimiter, various statistical measures can be computed by the delimiters determination engine 108. In the following example, it is assumed that the following statistical measures are computed: a unique field account (UFC), a field account deviation (FCD), and a shrinking record percent (SRP). Although specific example statistical measures are discussed, it is noted that in other examples, other types of statistical measures can be used by the delimiters determination engine 108 to identify delimiters in the data set D.

The UFC (unique field account) for a pair of a candidate record delimiter rd and a candidate field delimiter fd is denoted as UFC[rd, fd], which represents how many different quantities of fields are observed in the records of D. For example, in Case 1 above, all records have the quantity of fields, and so UFC[rd, fd]=1, where rd=";" and fd="," for Case 1. In each of Case 2, 3, and 5, there are records with two different quantities of fields, so that UFC[rd, fd]=2. In Case 4, there are records with three different quantities of fields, so that UFC[rd, fd]=3 for Case 4.

More generally, to compute UFC, the delimiters determination engine 108 determines a corresponding quantity of fields in each record of the records identified using a corresponding candidate record delimiter rd of a given pair of rd and fd. The delimiters determination engine 108 increments a count for each of the corresponding quantities of fields that is unique. The value of UFC is equal to the incremented count.

The FCD (field count deviation) for a pair of a candidate record delimiter rd and a candidate field delimiter fd is denoted as FCD[rd, fd], which represents the degree of a variation in field counts (quantities of fields in the records). In some examples, FCD[rd, fd] is computed as a standard deviation, such as according to Eq. 2.

$$FCD = \sqrt{\frac{\sum_i (FC_i - AVG(FC))^2}{R}}, \text{ for } 0 \le i \le R - 1, \quad \text{(Eq. 2)}$$

where R represents the total quantity of records in D, $FC_i$ is the field count representing the quantity of fields in record i, and AVG(FC) is the average field count of all records in D.

More generally, for a respective pair of rd and fd, FCD is an example of a measure indicating a degree of variation of field counts specifying quantities of fields in the records identified using the corresponding candidate record delimiter rd of the respective pair.

The SRP (shrinking record percent) for a pair of a candidate record delimiter rd and a candidate field delimiter fd is denoted as SRP[rd, fd], which represents how many records have smaller field counts than the field counts of previous records. The measure SRP can be used to disfavor a pair of rd and fd when it is expected that the schema of the data set of interest is likely to evolve in an increasing fashion, i.e., fields are expected to be added over time to a data set. If the quantity of fields decrease in a record as compared to previous records in the data set, then SRP will have a non-zero value; the more times the delimiters determination engine 108 detects a reduction in the quantity of fields in successive records, the larger the SRP value.

In some examples, SRP is computed according to Eq. 3 below.

$$SRP = \frac{\sum (f(i))}{R - 1} \text{ where } 0 \le i \le R - 2, \text{ and} \quad \text{(Eq. 3)}$$

$$f(i) = \begin{cases} 1, & \text{if } EC_{i+1} < FC_i \\ 0, & \text{otherwise} \end{cases}.$$

where $FC_{i+1}$ represents a quantity of records in record i+1 that immediately follows record i in D. A second record immediately follows a first record in a data set if there is no intervening record between the first and second records, and the second record was added to D after the first record.

More generally, for a respective pair of rd and fd, SRP is an example of a measure indicating how many times a quantity of fields has decreased in successive records of the records identified using the corresponding candidate record delimiter rd of the respective pair.

Another measure computed by the delimiters determination engine 108 is Freq[rd, fd], which is the frequency of a pair of a candidate record delimiter rd and a candidate field delimiter fd. Freq[rd, fd] is the sum of the quantity of appearances of the pair of rd and fd in D.

The delimiters determination engine 108 determines a record delimiter and a field delimiter for D based on the following parameters:
A set of candidate field delimiters.
A set of candidate record delimiters.
A quantity of field counts threshold (denoted as c), which is used to disqualify a pair of a candidate record delimiter rd and a candidate field delimiter fd, if UFC [rd, fd]>c.
A field count variation threshold (denoted as s), which is used to disqualify a pair of a candidate record delimiter rd and a candidate field delimiter fd, if FCD [rd, fd]>s.
A field count decrease threshold (denoted as p), which is used to disqualify a pair of a candidate record delimiter rd and a candidate field delimiter fd, if SRP [rd, fd]>p.

Figure 3:
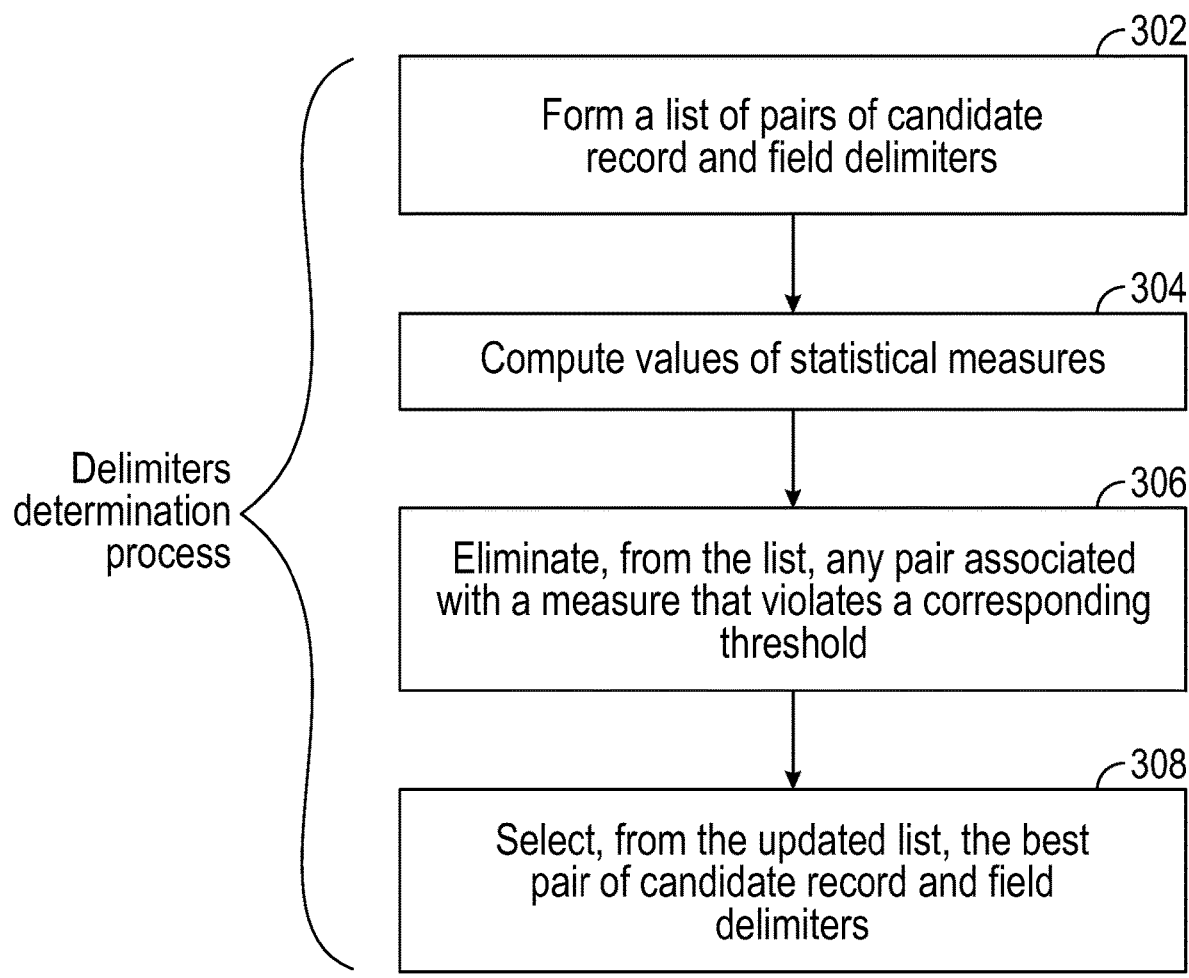
FIG. 3 is a flow diagram of an example delimiters determination process, according to some implementations of the present disclosure.

The delimiters determination engine 108 is able to identify record and field delimiters using an example delimiters determination process as shown in FIG. 3. The delimiters determination process includes forming (at 302) a list of pairs Pair_List where each pair includes a candidate record delimiter and a candidate field delimiter. Any pair in which a candidate record delimiter and a candidate field delimiter are the same is not included in Pair_List. For example, Pair_List would not include a pair with a candidate record delimiter that is set to a semicolon (";") and a candidate field delimiter also set to a semicolon.

The delimiters determination process includes computing (at 304) the values of the UFC, FCD, SRP, and Freq measures using collected statistical information, such as $FC_i$, AVG(FC), and R, for each pair of rd and fd in Pair_List.

The delimiters determination process includes eliminating (at 306), from Pair_List, any pair of rd and fd associated with a measure (UFC, FCD, or SRP) that violates a corresponding threshold c, s, or p, respectively (e.g., UFC[rd, fd]>c, FCD[rd, fd]>s, or SRP[rd, fd]>p). As a result of the elimination at 306, an updated list of pairs, Pair_List', is produced that includes one or more pairs of candidate record and field delimiters that are associated with UFC, FCD, and SRP measures that do not violate the corresponding thresholds c, s, or p, respectively.

The delimiters determination process includes selecting (at 308), from the updated list of pairs, Pair_List', the best pair of rd and fd based on a selection criterion. For example, the selection criterion is based on Freq[rd, fd] for each pair in Pair_List'. The pair in Pair_List' having the largest Freq [rd, fd] is considered the "best" in some examples. The delimiters determination process can sort all pairs in Pair_List' by their frequencies (Freq[rd, fd]) and the most frequent pair is determined as the selected record delimiter and field delimiter.

The following describes an example. It is assumed that D is a set of text data such as:

D=[1, a/b/c, 2022-10-01, 1.1\n
2, a/b/c, 2022-10-02, 3.2\n
3, d/e/f, 4.5\n
4, d/e/f/gh, 3.4, notes1\n
5, g/h/i/j/k, 1.9, notes2]

For the above example D, the set of candidate record delimiters=[";" "\n" "\r"], and the set of candidate field delimiters=[";" "|" "\t" "|" . . . <all non-alphabet non-numerical ASCII characters> . . . ].

The following are predefined threshold values: c=2, s=1, and p=5%.

Table 1 below lists candidate pairs of candidate record delimiters and candidate field delimiters, and corresponding statistical measures. Four pairs p1, p2, p3, and p4 are listed in Table 1. There are additional pairs based on the set of candidate record delimiters and the set of candidate field delimiters that are omitted from Table 1 for brevity.

TABLE 1

| ID | [rd, rd] pair | UFC | FCD | SRP | Freq |
|----|---------------|-----|------|-----|------|
| p1 | ["\n" ","]    | 2   | 0.49 | 0%  | 21   |
| p2 | ["\n" "/"]    | 3   | 0.8  | 0%  | 17   |
| p3 | ["\n" "-"]    | 2   | 0.98 | 25% | 8    |
| p4 | ["\n" "."]    | 1   | 0    | 0%  | 9    |
| ... | ...          | ... | ...  | ... | ...  |

UFCFCDSRPFregrdrdUFCFCDSRPFregFreqTable 1 also includes the values of measures , , , and for each pair [,]. For pair p1, D is decomposed into five records when using "\n" as the candidate record delimiter. The field count of the first 3 records is 3, and the field count of the last 2 records is 4 when using "," as the candidate field delimiter. of p1 is 2 since two unique field counts are observed in the records of D.

UFCFCDSRPFregrdrdUFCFCDSRPFregFreq of p1 is the standard deviation calculated from the field count set [3, 3, 3, 4, 4], which is 0.49. for p1 is 0% in this case because there is no record whose field count is decreased compared with a previous record. for p1 is the sum of total appearances of the candidate field delimiter character "," (17) and the total appearances of the candidate record delimiter character "\n" (4)—thus, for p1 is computed as 21.

The measures for the other pairs are similarly computed.

The thresholds, c=2, s=1, and p=5%, are applied based on the computed measures for the multiple pairs. Pair p2 is eliminated because UFC for p2 exceeds c=2. No pair is eliminated based on FCD because none of the FCD measures for pairs p1 to p4 is larger than s=1. Pair p3 is eliminated because SRP for p3 exceeds p=5%.

In the example, p1 and p4 pass all the threshold checks make up the updated pair list, Pair_List', to be considered for final selection according to the selection criterion noted above. Pair p1 is selected from, Pair_List' because Freq for p1 is greater than Freq for p4.

More generally, the content type determination engine 106 determines delimiters in DSV data by applying a heuristic-based delimiter identification process. The heuristic-based delimiter identification process includes identifying candidate record delimiters and candidate field delimiters in input data, and providing different pairs of candidate record delimiters and candidate field delimiters, where each respective pair of the different pairs includes a corresponding candidate record delimiter and a corresponding field delimiter.

For each respective pair of the different pairs, the heuristic-based delimiter identification process identifies records using the corresponding candidate record delimiter of the respective pair, and computes a collection of measures (a single measure or multiple measures) indicating a consistency in a quantity of fields observed in the records identified using the corresponding field delimiter of the respective pair.

The heuristic-based delimiter identification process selects, based on values of the collection of measures computed for corresponding pairs of candidate record and field delimiters, a selected record delimiter and a selected field delimiter.

Character Set Determination

This section describes an example process of determining a character set for input data D by the content type determination engine 106 (e.g., task 208 in FIG. 2). For the determination of a probable character set for input data D, the following statistics are collected from sample chunks for each character set of interest.

The quantity of multi-byte characters (denoted as NumOfMBC).

The quantity of invalid byte combinations for a specific character set encoding, charEnc (denoted as NumOfIBC[charEnc]).

The quantity of ASCII characters in terms of individual character set encoding.

A byte order mark.

Based on the statistics above, a best character encoding, charEnc, from among LATIN1, UTF8, UTF16 Big Endian (BE), UTF16 Little Endian (LE), etc., is determined according to the following character set determination process performed by the content type determination engine 106.

The input data D is determined to have the UTF8 character set encoding if NumOfMBC=0 and NumOfIBC [UTF8]=0 (i.e., all bytes are valid in terms of the rules that define possible UTF8 bytes).

The input data D is determined to have the UTF16 BE character set encoding if NumOfIBC[UTF16 BE]=0.

The input data D is determined to have the UTF16 LE character set encoding if NumOfIBC[UTF16 LE]=0.

Otherwise, if none of the foregoing applies, the input data D is determined to have the LATIN1 character set encoding.

Next, the character set determination process considers UTF16 BE and UTF16 LE. If the sample begins with a byte order mark, then the character set determination process only considers the encoding indicated by the byte order mark. Otherwise, the character set determination process considers both Endians. Absence of a byte order mark may indicate Big Endian but some vendors may ignore this part of the standard. Like UTF8 there are invalid byte sequences. If any such are found then UTF16 is eliminated from consideration. If both Endians are possible then the character set determination process chooses as a candidate the one with the greater number of characters in the ASCII range, where end-of-line and punctuation characters will be found. If the character set determination process were able to select a UTF16 candidate then the character set determination process may choose between UTF16 and the 8-bit candidate.

The count of characters in the ASCII range for the UTF16 candidate ought to match the number of nulls in the 8-bit candidate. If it is close enough then the character set determination process chooses the UTF16 candidate as the character set encoding. Any violations of the rules for multi-byte sequences will disqualify a character set.

Logical Data Model Determination

This section describes an example process of determining a logical data model by the content type determination engine 106 (e.g., task 210 in FIG. 2).

A logical data model for a given data set is discovered or determined by comparing a model pattern and a data pattern, where a "model pattern" is a predefined pattern for the logical data model regardless of a given data set D, and where a "data pattern" is a dynamically identified pattern from a given data set D. In an example, the content type determination engine 106 is to choose between three data models: JSON, XML, and DSV for five data sets.

The three model patterns are defined before the discovery process starts. For each of the five data sets, a data pattern is identified from the data set and the data pattern is compared with each of the three model patterns.

A logical data model is selected by attempting to pattern match a sample of each data set against each likely supported type. Rather than matching against the original sample each time, the content type determination engine 106 simplifies the process by making a "sketch" for the encoding, which condenses strings with non-delimiting characters into a single constant character. The sketch is then checked for conformance to the encoding.

For each supported format, a pass may be made over the rough sketch, if the proper delimiting characters appear, in order to try creating a detailed sketch for the format. In some examples, in the worst case, the content type determination engine 106 makes two guaranteed passes over the sample bytes and eight passes over the rough sketch.

The text characters are considered to either form data values or delimiters such as field separators, end of record markers, quoting characters, etc. To make a sketch for a given logical encoding, the sample bytes are read and while delimiters of interest are preserved, successive occurrences of other characters are replaced by a single character.

For efficiency the sketching can be performed in two parts. First a rough sketch is made preserving any delimiter character for any supported format. Quoting characters are preserved but their effect is ignored, which means that delimiters within quotes are still preserved. Second, each time a particular format is considered, the rough sketch is scanned with the particular delimiters in mind. The effect of quoting is preserved, which means that a quoted string is reduced to a single character indicating a data value and any delimiters within the quoted string are not preserved.

The resulting sketch is then pattern-matched according to rules particular to the format of the input data. For example, in the case of a DSV format each line of a sketch should be the same.

Supported formats are considered by the content type determination engine 106 in order. The content type determination engine 106 may either choose the first successful match, or may score each format according to various criteria with the best score chosen.

The content type determination engine 106 can use a combination of the above strategies. The content type determination engine 106 checks complex formats such as JSON and XML and chooses the first match, since it is unlikely to be a false match that another format may satisfy. If none of these succeed then the content type determination engine 106 considers DSV formats with several common delimiters: comma, tab, and pipe. More than one of these may match and the content type determination engine 106 chooses the one that scores highest.

DSV Data Parser

Once the delimiters (109 in FIG. 1) of the DSV data have been determined the delimiters determination engine 108, the DSV data parser 110 is used to parse the input data into records and fields. The records and fields can be provided by the DSV data parser 110 to the analytic system 104 for processing.

Since no standard exists to regulate the form of DSV data, it may be difficult to reliably identify data records and data fields in DSV data. Note that different variations of DSV data may be employed. For example, some control characters can be used to nullify record or field delimiters, such as in the following data value: "1234 Lincoln St., CA\"90000\", USA". Assuming a comma (,) is used as a field delimiter, the presence of the opening double quote (") at the beginning of the foregoing data value serves to nullify the comma as a field delimiter. In other words, due to the presence of the opening double quote, the comma in the quote is a data character rather than a field delimiter. Other symbols can be used to nullify field delimiters, record delimiters, and so forth.

The DSV data parser 110 according to some implementations of the present disclosure can consider the context around a potential delimiter character (for a record delimiter or a field delimiter) in assessing whether or not the potential delimiter character is to be treated as a delimiter or as a data character. A "data character" refers to a character that is considered to be part of a string value in a field of the DSV data. The string value of a DSV field is also referred to as a "DSV token." As a result, the DSV data parser 110 is able parse characters in DSV data that takes into account real-world uses in which some control characters may be used to nullify delimiters.

In some examples, the DSV data parser 110 can perform exception handling during parsing of DSV data, which can assist users to review and correct content when issues are identified.

In some examples of the present disclosure, the DSV data parser 110 uses a three-layer character interpretation model when parsing DSV data. The term "parsing" can refer to recognizing DSV records and DSV fields from input DSV data. The three-layer character interpretation model is able to consider the presence of control characters in DSV data that may nullify the function of DSV delimiters.

In some examples, the DSV data parser 110 splits DSV data into multiple DSV records and DSV fields, based on the six types of characters including: (1) data characters, (2) record delimiters, (3) field delimiters, (4) token definers, (5) literal groupers, and (6) nesting groupers.

The foregoing characters can be categorized into three layers of the three-layer character interpretation model. A first layer (layer 1) includes data characters. A second layer (layer 2) includes a record delimiter and a field delimiter, which delimits data characters (belonging to the first layer) into DSV records and fields.

In accordance with some examples of the present disclosure, a third layer (layer 3) of the three-layer character interpretation model of the includes token definers, literal groupers, and nesting groupers. Characters in the third layer are symbols used to group multiple string values into one semantic unit. Characters in the third layer can be used to nullify delimiter characters in the second layer, provided the delimiter characters are within a starting third layer character and an ending third layer character.

Table 3 below illustrates the three layers and the characters categorized into the three layers. In the example of Table 3, six categories of characters (token definer, literal grouper, nesting grouper, record delimiter, field delimiter, and data character) are listed. Within the six categories of characters, there are nine types of characters, including an opening definer (OD) and an ending definer (ED) that are part of the token definer category, an opening literal grouper (OLG) and an ending literal grouper (ELG) that are part of the literal grouper category, an opening nesting grouper (ONG) and an ending nesting grouper (ENG) that are part of the nesting grouper category, a record delimiter (RD) that is part of the record delimiter category, a field delimiter (FD) that is part of the field delimiter category, and a data character that is part of the data character category.

TABLE 3

| Layer | Category | Type | Meaning |
|---|---|---|---|
| Layer 3 | Token definer | OD (Opening definer) ED (Ending definer) | A pair of token definers is a pair of the same characters (e.g., double quotes) that define the scope (starting and ending positions) of a token. For example, field values in a DSV file exported by a tool like EXCEL, R, Python, etc. can be surrounded by a double quote character ("). |
| | Literal grouper | OLG (Opening literal grouper) ELG (Ending literal grouper) | A pair of literal groupers is a pair of the same character that make up a logical string unit. Characters within the literal groupers are considered as data characters. As examples, literal groupers are double quote characters ("). Literal groupers can be nullified (ignored) by an escaping character, e.g., a back-slash character (\). |
| | Nesting grouper | ONG (Opening nesting grouper) ENG (Ending nesting grouper) | A pair of nesting groupers is a pair of different characters which make up a logical string unit. Characters within the nesting groupers are considered as literal groupers, nesting groupers, or data characters. For example, literal groupers can be opening and ending braces { } or parentheticals ( ), and/or a pair of brackets [ ]. Nesting groupers can be nullified (ignored) by an escaping character such as a back-slash character (\). |
| Layer 2 | Record delimiter | RD | A record delimiter is a character that delimits DSV records. For example, a record delimiter is a new line character (\n) or another character. |
| | Field delimiter | FD | A field delimiter is a character that delimits fields (tokens). For example, a field delimiter is a comma (,) or another character. |
| Layer 1 | Data character | CHR | A data character is a character that does not have any special meaning, but rather is a data value contained in a field (token). |

Figure 4:
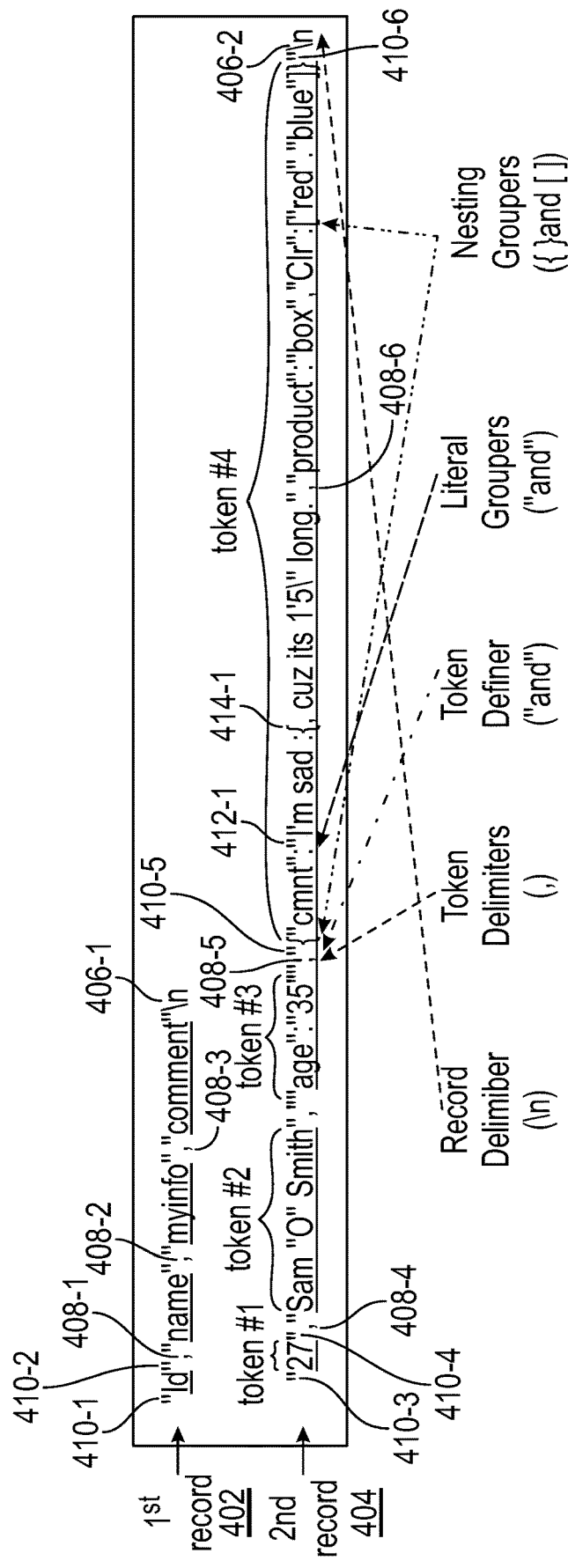
FIG. 4 illustrates various characters in records of DSV data, according to some examples.

FIG. 4 illustrates an example of DSV data that includes a first record 402 and a second record 404. The DSV data of FIG. 4 is comma separated value (CSV) data, which is an example of DSV data where a comma (,) is used as a field delimiter.

In the example of FIG. 4, the record delimiter is a new line character (\n) (406-1 and 406-2 shown). The field delimiter is a comma (,) such as 408-1, 408-2, 408-3, 408-4, and so forth. Token definers are in the form of double quotes ("), such as 410-1 and 410-2. The token definers 410-1 and 410-2 define a data character string (id), that is in a field defined by the field delimiter 408-1.

Literal groupers are also in the form of double quotes ("). The distinction between when a double quote is used as a token definer or a literal grouper is as follows: an opening token definer (OD) follows a delimiter (a record delimiter RD or field delimiter FD) or a start of stream (SOS), and an ending token definer (ED) is followed by a delimiter (RD or FD) or an end of stream (EOS).

An SOS refers to the start of a record, such as on a new line. An EOS refers to an end of a record. A second character (e.g., a double-quote character for an OD) "follows" a first character (e.g., a character of an RD or FD) if the second character immediately follows the first character such that there is no intervening character between the first and second characters.

A first character (e.g., a double-quote character for an ED) is "followed" by a second character (e.g., a character of an RD or FD) if the first character is immediately followed by the second character such that there is no intervening character between the first and second characters.

For example, the double-quote character 410-1 is an OD (opening token definer) in the first record 402 because the double-quote character 410-1 immediately follows the SOS of the CSV data shown in FIG. 4. The double-quote character 410-3 is an OD in the second record 404 because the double-quote character 410-3 immediately follows the RD (record delimiter) 406-1. The double-quote character 410-4 is an ED (ending token definer) in the second record 402 because the double-quote character 410-4 is followed immediately by the FD (field delimiter) 408-4.

Similarly, the double-quote character 410-5 is an OD in the second record 404 because the double-quote character 410-5 immediately follows the FD 408-5. However, a double-quote character 412-1 is an OLG (opening literal grouper) because the double-quote character 412-1 does not follow a delimiter or an SOS, and is not followed by a delimiter or an EOS. Rather, the double-quote character 412-1 (an OLG) is within Token 4 defined by the OD 410-5 and an ED 410-6.

The OD 410-3 and the ED 410-4 defines Token 1. Similarly, other pairs of ODs and EDs define Token 2 and Token 3.

As further shown in FIG. 4, a comma character 408-6 is inside Token 4 defined by the OD 410-5 and the ED 410-6. The comma character 408-6 is not treated by the DSV data parser 110 as a field delimiter, because the comma character 408-6 is embedded within the OD 410-5 and the ED 410-6; i.e., the OD 410-5 and the ED 410-6 server to nullify the comma character 408-6 as a field delimiter.

The hierarchy of layers (1, 2, and 3) of the three-layer character interpretation model used by the DSV data parser 110 governs an order of how a given character is to be parsed, starting by determining if the given character is part of layer 3, and if not part of layer 3, if the given character is part of layer 2, and if not part of layer 2, it is determined that the given character is a data character.

In layer 3, a token defined by token definers (OD and ED) can include other groupers (literal groupers and nesting groupers) in layer 3. For example, the OLG 412-1 is in Token 4 defined by the OD 410-5 and the ED 410-6. Similarly, an ONG (opening nesting grouper) 414-1 is in Token 4 defined by the OD 410-5 and the ED 410-6. Thus, a token defined by token definers can have one or more groups, where each group includes a string of characters defined by groupers (literal groupers or nesting groupers).

The DSV data parser 110 determines what character type (one of the nine types listed in Table 3) a given character c is based on the following rules:

Predefined character sets are specified for each character type in layers 2 and 3. For example, for layer 3, the character set for OD and ED is the double quote ("), the character set for OLG and ELG is the double quote ("), the character set for ONG is {or [, and the character set for ENG is} or]. For layer 2, the character set for RD is \n, and the character set for FD is the comma (,). In other examples, other character sets can be defined.

There is no character that belongs to more than one character type, with the exception that a character (e.g., ") can belong to the character sets for the field definers and the literal groupers.

An OD follows a delimiter character or an SOS, and an ED is followed by a delimiter or an EOS.

All characters between an OLG and an ELG are considered data characters.

There is at most one pair of token definers for a token.

There can be multiple groups (i.e., multiple pairs of opening and ending groupers) in a field (token).

One group can be completely covered by another group.

Two groups do not partially overlap.

Figure 5A:
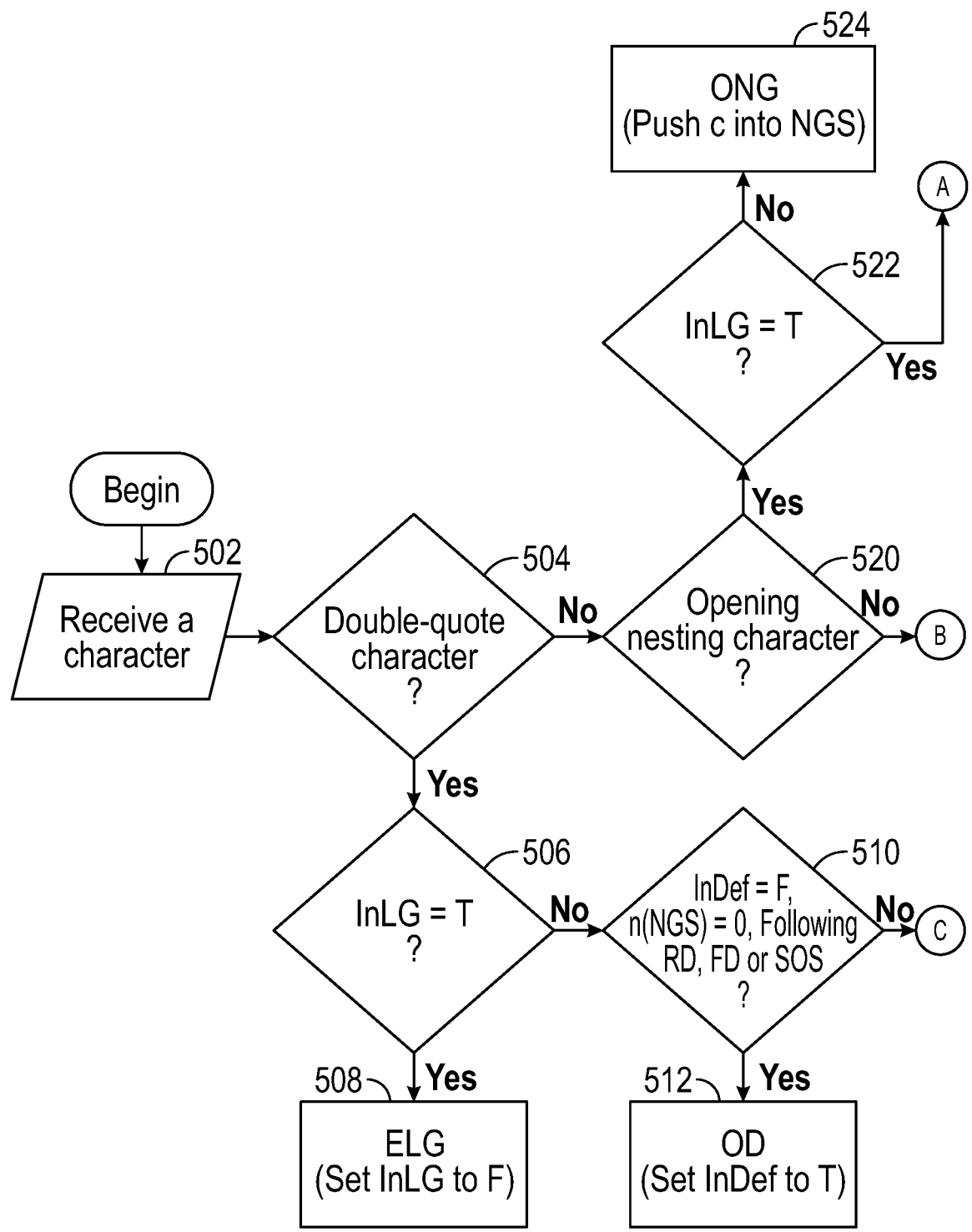
FIGS. 5A-5B depict a flow diagram of a process of parsing a character in DSV data, according to some examples.
Figure 5B:
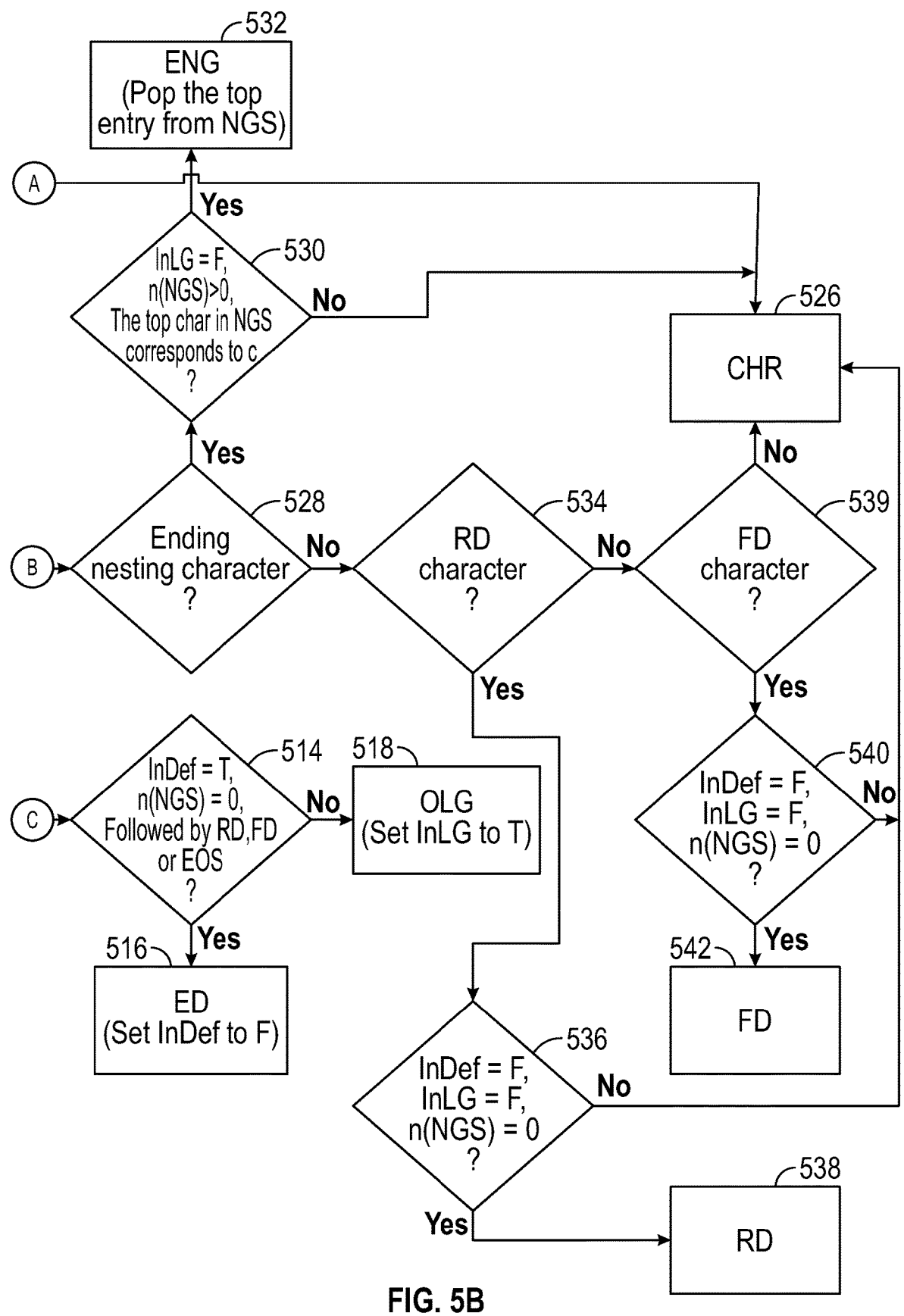

FIGS. 5A-5B depict a flow diagram of a DSV data parsing process performed by the DSV data parser 110 according to some implementations of the present disclosure. The DSV data parser 110 receives (at 502) a character c that is part of input DSV data. Note that characters are processed one at a time from the input DSV data, so that the character c that is received is the latest character to be parsed.

The DSV data parsing process maintains the following data structures: a parameter InDef which when set to a true value (T) indicates that the current character being processed is inside a pair of token definers; a parameter InLG which when set to T indicates that the current character being processed is inside a pair of literal groupers; and NGS, which is a nesting grouper stack storing all unclosed nesting groupers observed so far. As an example, a true value of InDef can be 1, while a false value of InDef can be 0 (or vice versa). A true value of InLG can be 1, while a false value of InLG can be 0 (or vice versa).

A "stack" can refer to a memory element that successively stores data items. The nesting grouper stack (NGS) successively adds opening nesting grouper characters as they are encountered (adding an opening nesting grouper character to the NGS can be referred to as pushing the opening nesting grouper character into the NGS). When a closing nesting grouper character corresponding to an opening nesting grouper character in the NGS is encountered by the DSV data parser 110, the DSV data parser 110 can remove the opening nesting grouper character from the NGS, which can be referred to as popping the opening nesting grouper character from the NGS. Any opening nesting grouper character that is in the NGS is considered an unclosed nesting grouper character. Since a nested string of characters can be nested within another nested string, there can be an arbitrary number of opening nested grouping characters that can be pushed into the NGS.

The DSV data parser 110 determines (at 504) whether the character c is a double-quote character. If so, the DSV data parser 110 determines (at 506) whether InLG is true. If InLG is true, the DSV data parser 110 marks (at 508) the character c as being an ELG (ending literal grouper), and also sets InLG to false (F).

If the DSV data parser 110 determines (at 506) that InLG is not true, then the DSV data parser 110 determines (at 510) if all of the following conditions are true: InDef is false, N(NGS) equals 0, and the character c follows an RD (record delimiter), an FD (field delimiter), or an SOS. The parameter n(NGS) represents the number of items in the nesting grouper stack NGS. The parameter n(NGS) equal 0 indicates that no unclosed nesting group has been observed.

If all of the conditions determined (at 510) are true, then the DSV data parser 110 marks (at 512) the character c as being an OD (opening token definer), and sets InDef to true.

If any of the conditions determined (at 510) is not true, then the DSV data parser 110 determines (at 514) whether all of the following conditions are true: InDef is true, n(NGS) equal 0, and the character c is followed by an RD, an FD, or an EOS. If all of the above conditions determined (at 514) are true, then the DSV data parser 110 marks (516) the character c as being an ED (ending token definer), and sets InDef to false.

If any of the conditions determined (at 514) is not true, then the DSV data parser 110 marks (at 518) the character c as being in an OLG (opening literal grouper), and sets InLG to true.

If the DSV data parser 110 determines (at 504) that the character c is not a double-quote character, the DSV data parser 110 determines (at 520) whether the character c is an opening nesting grouper character (e.g., { or [). If so, the DSV data parser 110 determines (at 522) whether InLG is true. If not, the DSV data parser 110 marks (at 524) the character c as an ONG (opening nesting grouper), and pushes the character c into NGS (since the character c is an observed unclosed nesting grouper).

If the DSV data parser 110 determines (at 522) that InLG is true (which indicates that the opening nesting grouper character is within literal grippers), the DSV data parser 110 marks (at 526) the character c as a data character (CHR).

If the DSV data parser 110 determines (at 520) that the character c is not an opening nesting grouper character, the DSV data parser 110 determines (at 528) whether the character c is in ending nesting grouper character (e.g., } or ]). If so, the DSV data parser 110 determines (at 530) if all of the following conditions are true: InLG is false, N(NGS)>0, and the top character in NGS corresponds to c. The "top character in NGS" is the nesting grouper character at the top of the stack NGS. The top character in NGS "corresponds" to c if the top character in NGS is the opening nesting grouper character for c (e.g., c is } and the top character in NGS is {).

If all the conditions determined (at 530) are true, then the DSV data parser 110 marks (at 532) the character c as an ENG (ending nesting grouper), and pops the top entry from the NGS. If any of the conditions determined (at 530) is not true, then the DSV data parser 110 marks (526) the character c as a data character.

If the DSV data parser 110 determines (at 528) that the character c is not an ending nesting grouper character, the DSV data parser 110 determines (at 534) whether the character c is an RD character. If so, the DSV data parser 110 determines (at 536) whether all of the following conditions are true: InDef is false, InLG is false, and n(NGS) equal 0. If all of the conditions determined (at 536) are true, then the DSV data parser 110 marks (at 538) the character c as an RD. However, if any of the conditions determined (at 536) is not true, the DSV data parser 110 marks (at 526) the character c as a data character.

If the DSV data parser 110 determines (at 534) that the character c is not an RD character, the DSV data parser 110 determines (at 539) whether the character c is an FD character. If so, the DSV data parser 110 determines (at 540) if all of the following conditions are true: InDef is false, InLG is false, and n(NGS) equal 0. If all the conditions determined (at 540) are true, the DSV data parser 110 marks (at 542) the character c as an FD. If any of the conditions determined (at 540) is not true, then the DSV data parser 110 marks (at 526) the character c as a data character.

More generally, the DSV data parser 110 receives DSV data, and categorizes a character in the DSV data into a selected layer of a plurality of layers, where characters in a first layer (layer 1) of the plurality of layers include data characters, characters in a second layer (layer 2) of the plurality of layers include delimiters, and characters in a third layer (layer 3) of the plurality of layers include grouping symbols (e.g., token definers, literal groupers, nesting groupers) to group a string of characters into a semantic unit. The DSV data parser 110 parses the DSV data according to the categorizing.

In some examples, the DSV data parser 110 categorizes a character in the DSV data as an OLG (opening literal grouper) (e.g., task 518 in FIG. 5B) responsive to a first parameter (e.g., InLG) set to a false value indicating that an unclosed literal grouper was not previously encountered, an indication that the character does not follow any of a delimiter or an SOS indicator, and an indication that the character is not followed by any of a delimiter or an EOS indicator.

The DSV data parser 110 categorizes a second character in the DSV data as an ELG (ending literal grouper) (e.g., task 508 in FIG. 5A) in the third layer responsive to the first parameter (e.g., InLG) set to a true value indicating that an unclosed literal grouper was previously encountered. An "unclosed" literal grouper refers to a literal grouper whose corresponding ending literal grouper has not yet been encountered by the DSV data parser 110.

In some examples, the DSV data parser 110 categorizes a second character in the DSV data as an OD (opening token definer) (e.g., task 512 in FIG. 5A) in the third layer responsive to the first parameter (e.g., InLG) set to a false value indicating that an unclosed literal grouper was not previously encountered, a second parameter (e.g., InDef) set to a false value indicating that an unclosed token definer was not previously encountered, a third parameter (e.g., n(NGS)) set to a first value (e.g., 0) indicating that an unclosed nesting grouper was not previously encountered, and an indication that the second character follows any of a delimiter or a start of stream indicator.

The DSV data parser 110 categorizes a second character in the DSV data as an ED (ending token definer) (task 516 in FIG. 5B) in the third layer responsive to the first parameter (e.g., InLG) set to a false value indicating that an unclosed literal grouper was not previously encountered, a second parameter (e.g., InDef) set to a true value indicating that an unclosed token definer was previously encountered, a third parameter (e.g., n(NGS)) set to a first value (e.g., 0) indicating that an unclosed nesting grouper was not previously encountered, and an indication that the second character is followed by a delimiter or an end of stream indicator.

In some examples, the DSV data parser 110 categorizes a character in the DSV data as an ONG (opening nesting grouper) (e.g., task 524 in FIG. 5A) responsive to the character being a first nesting grouper character, and a parameter (e.g., InLG) set to a false value indicating that an unclosed literal grouper was not previously encountered.

The DSV data parser 110 categorizes a second character in the DSV data as an ENG (ending nesting grouper) (e.g., task 532 in FIG. 5B) in the third layer responsive to the second character being a second nesting grouper character, the parameter (e.g., InLG) set to the false value indicating that an unclosed literal grouper was not previously encountered, and a further parameter (e.g., n(NGS)) set to a value (e.g., a greater than zero value) indicating that an unclosed nesting grouper was previously encountered.

In some examples, the DSV data parser 110 categorizes a second character in the DSV data as a delimiter (e.g., task 538 or 542 in FIG. 5B) in the second layer responsive to the second character being a delimiter character, a first parameter (e.g., InLG) set to a false value indicating that an unclosed literal grouper was not previously encountered, and a second parameter (e.g., InDef) set to a false value indicating that an unclosed token definer was not previously encountered, and a third parameter (e.g., n(NGS)) set to a value (e.g., 0) indicating that an unclosed nesting grouper was not previously encountered.

In some examples, the DSV data parser 110 can handle various exceptions when parsing a given character c. The following describes techniques for handling each of the exceptions in some examples.

A first exception is an unexpected ending symbol character exception. A second exception is a mismatching ending symbol character exception. A third exception is a no ending symbol exception.

The unexpected ending symbol character exception involves identifying the character c as an ENG (ending nesting grouper) but the nesting grouper stack NGS is empty, i.e., n(NGS)=0 when the character c is identified as an ENG. If this exception occurs, two example approaches can be taken. In approach #1 (As-Null-Character Approach), the ENG character c is ignored and not included in the current token. In approach #2 (As-Data-Character Approach), the ENG character c is considered as a data character, so the character is included in the current token.

The mismatching ending symbol character exception involves an ENG (ending nesting grouper) not matching the top entry of the nesting grouper stack NGS. When this exception occurs, the DSV data parser 110 can handle the exception in any of various different ways as listed below. A user can determine how to handle a mismatch. The user can also specify the maximum number (threshold) of mismatches that can be tolerated and allows the DSV data parser 110 to handle up to the maximum number of mismatches. If the number of mismatches exceeds the threshold, the DSV data parser 110 stops its parsing and can issue an execution failure, and the DSV data parser 110 does not return any schema recommendation but provides error messages.

Approach #1 (As-Data-Character Approach). The mismatching ENG character c is considered as a data character. The popped ONG (from the NGS) for the comparison is pushed back to the NGS. This option assumes that the nesting structure of the input DSV stream is well-formed (i.e., all ONGs have their own ENGs in the stream).

Approach #2 (As-Matching-Grouper Approach). The mismatching ENG character c is considered as a matching ENG. Therefore, the popped ONG is not pushed back to the stack. This option assumes that the mismatching ENG character c is a typographical error which is supposed to be a matching ENG.

Approach #3 (As-Multi-Matching-Grouper Approach). Entries are popped from the NGS until a matching ONG character is popped. This option assumes that expected ENGs for the ONGs in the stack are omitted mistakenly in the input DSV data stream. If nothing in the NGS matches the ENG character c, then this exception is handled like the unexpected ending symbol character exception.

Approach #4 (Flattened-Token Approach). Clean up the entire NGS and start over interpreting the structure of a token. The mismatching ENG is considered as a data character.

The no ending symbol exception involves the NGS not being empty and/or a token definer was found but the given character c is the last character of a DSV data stream or within a maximum token window. A user may want the DSV data parser 110 to stop its processing if this exception occurs. Alternatively, the user could choose one of the following:

Approach #1 (As-Ending-Definer Approach): Consider the character c as the end of the current token.

Approach #2 (Retrospective-Token Approach): Seek the last symbol (i.e., characters in Layer 2 and Layer 3) in the current token (i.e., within the first character of the current token to the character c), and define the end of a token to the last symbol. A new token is considered after the last symbol, which means that the DSV data parser 110 has to be capable of moving backward to the last symbol.

When an exception occurs, an exception report message can be formed and logged for access by a user. The exception report message can include any or some combination of the following information:

A character for which the exception is found. This character is called an exception character. An offset of the exception character is included.

Expected character for the exception character.

Starting offset of a field to which the exception character belongs.

Position of a field to which the exception character belongs. Starting offset of a record to which the exception character belongs. Position of a record to which the exception character belongs.

Size of the current field up to an exception character. This is optional, since it can be derived from the starting offset of a field and the offset of the exception character.

Size of the current record up to an exception character. This is optional, since it can be derived from the starting offset of a field and the offset of the exception character.

Information of InDef, InLG, the depth and content of the NGS.

Excerpt of CSV data content around the exception character (e.g., n bytes before/after the exception character)

Error Statement which explains the current exception.

Field Name Determination in DSV Data

Analytic systems can include mechanisms to fetch and analyze DSV data. A DSV file can be treated as a relation including columns (fields) and rows (records) in a relational database model. To access column (field) values, analytic systems can support two access methods: (1) reference by column position, or (2) reference by column name. While column positions can be given naturally and can be used by analytic systems without any confusion, field names are not always given clearly or erroneous field names may be provided by users. For example, field names may or may not be specified at the beginning of a DSV file, and user-provided field names may have duplicates or may conflict with system constraints. Unclear or erroneous field names may increase the likelihood that a user has to manually intervene to determine field names in DSV data.

In accordance with some implementations of the present disclosure, the DSV field names determination engine 112 can detect the presence of field names in DSV data, if field names are present, the DSV field names determination engine 112 can determine how many lines are used for field names. A "line" refers to a row in the DSV data. The DSV field names determination engine 112 does not rely on a user-specified parameter to inform whether a first record or first few records of a DSV file represents field names or not. Rather, the DSV field names determination engine 112 applies a heuristic-based technique to perform the detection of field names.

Further, the DSV field names determination engine 112 can automatically resolve conflicting field names while keeping the original meaning of a field name as much as possible. The field names determined by the DSV field names determination engine 112 can be consistent with a maximum field name length constraint and can avoid the use of reserved keywords. Conflicting field names can include duplicative field names as well as any other field names that cannot be used as they are defined, such as by a user or another entity.

The DSV field names determination engine 112 can perform the detection of field names and the resolution of conflicting field names in multiple DSV files.

Figure 6:
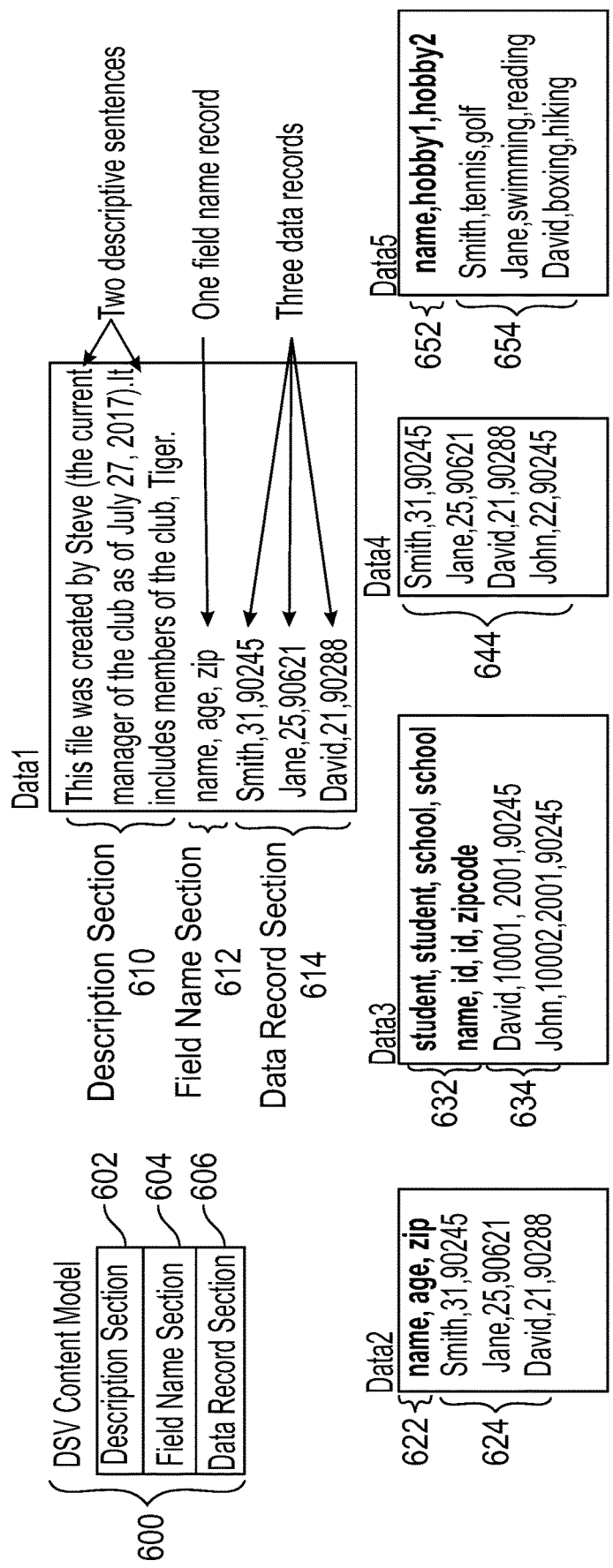
FIG. 6 is a block diagram of example sections of DSV data.

The following describes field name detection performed by the DSV field names determination engine 112. As shown in FIG. 6, the content of DSV data (e.g., a DSV file such as a CSV file) can be according to a DSV content model 600 that has three sections: a description section 602, a field name section 604, and a data record section 606.

The description section 602 includes descriptive sentences regarding the DSV file. Note that the description section 602 may or may not exists in a DSV file.

The field name section 604 includes a set of lines (one line or multiple lines), where each line includes delimiter separated values and each value represents a field name. A line in the field name section 604 is referred to as a field name record. The field name section 604 may or may not exist in a DSV file.

The data record section 606 includes a set of lines (one line or multiple lines), where each line includes delimiter separated values and each value represents a data value. A line in the data record section 606 is referred to as a data record.

Several different example DSV files Data1, Data2, Data3, Data4, and Data5 are shown in FIG. 6. The DSV file Data1 has a description section 610 with two descriptive sentences, a field name section 612 with one field name record, and a data record section 614 with three data records.

None of the DSV files Data2, Data3, Data4, and Data5 have a description section.

The DSV file Data2 has a field name section 622 with one field name record, and a data record section 624 with three data records.

The DSV file Data3 has a field name section 632 with two field name records, and a data record section 634 with two data records.

The DSV file Data4 has a data record section 644 with four data records, but does not have a field name section.

The DSV file Data5 has a field name section 652 with one field name record, and a data record section 654 with three data records.

The DSV field names determination engine 112 detects field names by determining, in a DSV file, where a field name section starts and where a data record section starts.

As used here, a "first line" in a DSV file (or more generally, DSV data) can refer to the very first line of the DSV file. Thus, if a DSV file (or DSV data) starts at line 1 and proceeds with additional lines, then the "first line" refers to line 1.

The DSV field names determination engine 112 determines a presence of a description section in a DSV file based on finding a first record in the DSV file, where a "first record" refers to either a first field name record or a first data record. The DSV file (or more generally, DSV data) can include multiple records, starting with the first record and proceeding with additional record(s) further down in the DSV file (or DSV data).

In the vast majority of cases, the quantity of fields in the first record is consistent with the quantity of fields in subsequent records of the DSV file. The DSV field names determination engine 112 attempts to find the first record by comparing the quantity of fields in the first line with the quantity of fields in s (s≥1) subsequent lines of the DSV file. Identifying the quantity of fields in a line of the DSV file is based on identifying fields delimited by field delimiters (e.g., commas in a CSV file) and counting how many fields are present in the line. If the quantity of fields in the first line of the DSV file is different from the quantity of fields in the s subsequent lines, then that is an indication that the first line is not a first record (i.e., it is neither a field name record nor a data record). The same comparison is performed of each subsequent line in the DSV file with the s subsequent lines, until a line with a consistent quantity of fields as the next s subsequent lines is found.

For example, in the DSV file Data1 of FIG. 6, the first line has one field (because there is no comma delimiter in the first line), and each of the second line and the third line has two fields (because of one comma delimiter in each of the second line and the third line), and each of the fourth through seventh lines has three fields (because each of the fourth through seventh lines has two comma delimiters). In this example, the fourth line is identified by the DSV field names determination engine 112 as being the first record, because the fourth line has the same quantity of fields as the next two subsequent lines (assuming s=2). Note that the second line is not identified as the first record, because the second line does not have the same quantity of fields as the next two subsequent lines. In the DSV file Data1, the DSV field names determination engine 112 identifies the first three lines as making up the description section 610.

Generally, for each respective line (starting with the first line and proceeding down successive lines) of a DSV file, if the DSV field names determination engine 112 does not identify the respective line as being a record, then the respective line is identified as being part of the description section. Note that if the first line of the DSV file is identified as a first record, then it is assumed that no description section exists in the DSV file.

Once the first record is detected by the DSV field names determination engine 112 as performed above, the DSV field names determination engine 112 determines whether the first record is a field name record or a data record. In the vast majority of cases, a data type of a field name is the character type (e.g., CHAR or VARCHAR). In other words, if a record has any non-character-type values (e.g., a value of a numeric type, a value of a date type, a value of a timestamp type, etc.), the record is likely to be a data record as opposed to a field name record.

The DSV field names determination engine 112 can look up a first quantity (θ) of sampled records (the "sample") in the DSV file and determine where the first data record is positioned in the sample. In other words, the sample includes θ records, where θ≥1. If the position of the first data record in the sample is 1 (i.e., the first record in the sample is the data record), the DSV field names determination engine 112 concludes that no field name record exists and that the DSV file does not include field names.

If the position of the first data record is greater than 1 in the sample, the DSV field names determination engine 112 treats any previous record(s) before the position of the first data record as a field name record.

If the DSV field names determination engine 112 detects that all records in the sample includes character-type field values, the DSV field names determination engine 112 concludes that the first record in the sample is the field name record.

The quantity (f) of field name records is determined by the DSV field names determination engine 112 as follows:

$$f=n(\text{if } n<\text{MIN}(N,\theta)); \text{ otherwise } f=1(\text{if } n=\text{MIN}(N,\theta),$$

where N≥1 represents the total quantity of DSV records in a DSV file, θ represents a threshold to set the quantity of DSV records to investigate (θ≥1), MIN(N, θ) is a function to return the smallest value of the two values N and θ, and n represents the quantity of DSV records, from the beginning of the DSV file, that include delimiter separated values all of which are of the character type. The threshold θ is used to limit the quantity of records that are investigated by the DSV field names determination engine 112 to identify presence of field names, for more efficient resource usage.

The DSV field names determination engine 112 detects field name record(s) whenever n is smaller than or equal to MIN(N, θ). In such cases, the first record or first n record(s) is (are) considered as field name record(s).

If n=0 then f is set as 0, which means that the DSV field names determination engine 112 did not find field names in the first θ quantity of sampled records.

As discussed above, in the DSV file Data1 of FIG. 6, the DSV field names determination engine 112 has identified the first three lines as making up the description section 610. The DSV field names determination engine 112 next proceeds to find the first data record in Data1, by checking four (assume θ=4) records starting at the first record following the description section 610. The four records checked include the first record (in the fourth line of Data1) and three more records following the first record. The second record (the fifth line in Data1) is identified as a data record because of the presence of non-character values "31" and "90245," which are integers (i.e., not of the character type). Note that the DSV field names determination engine 112 has also determined that the first record (fourth line in Data1) has values that are all of the character type. Based on the foregoing, the DSV field names determination engine 112 determines that the first record (fourth line of Data1) is a field name record.

The following describes further examples of how field name records are identified in the DSV files Data2 to Data5, assuming s=2 and θ=4. It is also assumed that each of Data2 to Data5 has N=1000 records.

In Data2, the DSV field names determination engine 112 identifies the first line as the first record, since the first line has three fields and each of the next two (s=2) lines also has the same quantity of fields, which means there is no description section. The DSV field names determination engine 112 identifies the first record as a field name record, since the second record (in the second line of Data2) is identified as the first data record because of the presence of non-character values "31" and "90245" in the second line.

In Data3, the DSV field names determination engine 112 identifies the first and second lines as the first and second records (i.e., no description section). The DSV field names determination engine 112 identifies the third line as the first data record with non-character values (i.e., the first and second lines are identified as field name records).

In Data4, the DSV field names determination engine 112 identifies the first line as the first record (i.e., no description section). The DSV field names determination engine 112 also determines that the first record in the first line is a data record, based on the presence of non-character values in the first line. In Data4, there is no field name record.

In Data5, the DSV field names determination engine 112 identifies the first line as the first record (i.e., no description section). The first data record is not determined by data types because all four sampled records include character-type values. In such a case, the first record is identified as a field name record and the second record is identified as the first data record.

More generally, the DSV field names determination engine 112 identifies a sample of lines in input DSV data, and identifies a first record in the sample based on comparing a quantity of fields in a line in the sample with a quantity of fields in line of a subsequent collection of lines. A "sample" can refer to a portion (less than the entirety) of the DSV data, or can refer to the entire DSV data. The DSV field names determination engine 112 determines whether the first record is a field name record or a data record. The DSV field names determination engine 112 can identify the first record by determining that a quantity of fields in the first record match a quantity of fields in one or more subsequent (s) records following the first record.

The DSV field names determination engine 112 can determine, based on the comparing, that one or more first lines in the DSV data form a description section.

The DSV field names determination engine 112 can determine whether the first record is a field name record or a data record by determining a data type of values in the first record. The DSV field names determination engine 112 can determine that the first record is the field name record based on determining that the values in the first record are of a character type. The DSV field names determination engine 112 can determine that the first record is the data record based on determining that the values in the first record are of a non-character type.

The following describes examples of how the DSV field names determination engine 112 performs conflicting field name resolution, according to some implementations of the present disclosure. The DSV field names determination engine 112 can use a field name model that has two parts: (1) field name root and (2) suffix.

The field name root is a string that represents the name of a field semantically. The suffix is a string that differentiates conflicting field names with a common field name root. The suffix can be a numerical string appended to the field name root, and is incremented by 1 for each duplicate field name. The suffix is an empty string if a field name root is unique (i.e., there is not a previous field that has the same the field name root). For example, suppose three field names in a DSV file has the same field name root "hobby". The suffix of the first field name has an empty string as a suffix (i.e., "hobby"). The suffix for the second field name is "1" ("hobby_1"), and the suffix for the third field name is "2" ("hobby_2").

The maximum length (e.g., maximum number of bits) of the suffix depends on the number of fields in a record allowed by the DSV field names determination engine 112. For example, the maximum length of a suffix is formulated as $CEIL(LOG_R(\text{Total number of allowed fields}))$, which is added to the length of a connection string that connects the suffix to the field name root. For example, the connection string can be the underscore symbol "_" or another symbol. The form of a field name with a non-empty suffix can thus be FIELD-NAME-ROOT_SUFFIX. CEIL(x) is a ceiling function to return the nearest integer greater than or equal to x, and R is a radix (number of independent digits in a system).

For example, if a decimal system (i.e., R=10) allows 2,000 fields and the underscore symbol (i.e., "_") is used as a connecting string, then the maximum suffix length is 5. The maximum suffix length (Suffix Length) affects the maximum length of the field name root. The length of the field name root does not exceed (1) the default length of the candidate field name, and (2) the length produced by subtracting the length of the suffix from the maximum field name length allowed. For example, if the maximum field name length allowed by a system is 256 bytes, and the length of the suffix calculated is 5, and the length of a candidate field name (e.g., COL) is 3, then the length of the field name root is calculated as MIN(3, 256−5), which is 3.

More generally, the length of the field name root is computed as MIN (Length of Candidate Field Name, N−Suffix Length), where N is the maximum field name length allowed in a system. Note that the candidate field name being considered is the actual field name in a field name record, or a field name used by the system to replace an original field name if the original field name is not allowed (e.g., appears in a reserved word list).

The DSV field names determination engine 112 performs duplicate checking by identifying that multiple field names (including any suffix) in a field name record share a common field name root. In this case, the DSV field names determination engine 112 determines that duplicate field names are present.

In an example, a field name record has the following candidate field name list: [Name, Hobby, Hobby, Hobby_1], which includes a first field name ("Name"), a second field name ("Hobby"), a third field name ("Hobby"), and a fourth field name ("Hobby_1"). The DSV field names determination engine 112 determines from the field names in the candidate field name list that multiple field names share a field name root is "Hobby". The DSV field names determination engine 112 can rename the third field name from "Hobby" to "Hobby_2" since the candidate field name list already has "Hobby" as the second field name and "Hobby_1" as the fourth field name. Hence, the updated field name list as updated by the DSV field names determination engine 112 is [Name, Hobby, Hobby_2, Hobby_1).

Figure 7:
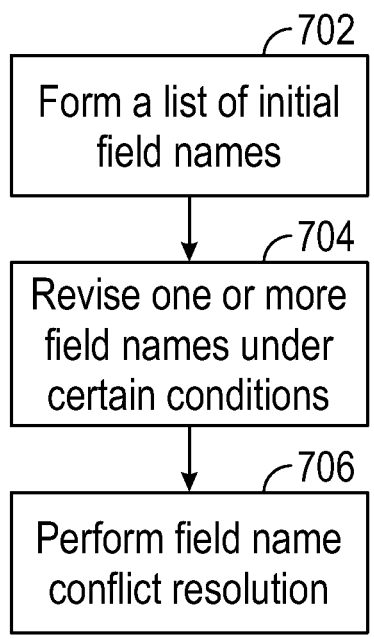
FIG. 7 is a flow diagram of a conflicting field name resolution process according to some examples.

FIG. 7 shows an example field names determination process performed by the DSV field names determination engine 112. The DSV field names determination engine 112 forms (at 702) a list of initial field names that appear or are to be used in a field name record of a DSV file. Several sources of field names are possible. First, field names may be specified in a DSV file. Second, field names may be specified by a user, such as in a user interface. Third, default system field names may be used.

The DSV field names determination engine 112 can revise (at 704) one or more field names appearing in the list of initial field names under certain conditions. In some cases, no field name revision is performed.

For example, if a field name is too long (i.e., the length of the field name exceeds a length threshold), then the DSV field names determination engine 112 prunes out (removes) characters with offsets in the field name greater than the length threshold. The length threshold can be set based on the maximum field name length that a system can support, e.g., CEIL(LOG$_{10}$(Maximum number of fields)+1).

The DSV field names determination engine 112 can also remove any characters from a candidate field name (in the list of initial field names) that are not allowed in a field name. The DSV field names determination engine 112 can replace the candidate field name with a system-generated field name, for example, if the candidate field name is not allowed by a system, such as the analytic system 104 of FIG. 1.

The DSV field names determination engine 112 performs (at 706) field name conflict resolution in the list of field names. The DSV field names determination engine 112 is to produce an output list of field names based on the list of initial field names, by performing any revision in task 704 and any field name renaming in task 706.

As part of the field name conflict resolution, the DSV field names determination engine 112 identifies a field name root in potential conflicting field names. If there is a conflict between field names in the list of field names, the DSV field names determination engine 112 avoids repeating field names by: (1) determining a new field name ("conflict-resolved field name"), and (2) searching if there is an identical field name in the list to the conflict-resolved field name. If there is a conflict between an original field name and a conflict-resolved field name, the DSV field names determination engine 112 keeps the original field name and modifies the conflict-resolved field name further by adding a suffix to the original field name root to avoid further conflicts.

Additional Examples

In FIG. 1, each of one or more of the content type determination engine 106, the delimiters determination engine 108, the DSV data parser, and the DSV field names determination engine 112 can be implemented using one or more hardware processors. A hardware processor can include a microprocessor, a core of a multi-core microprocessor, a microcontroller, a programmable integrated circuit, a programmable gate array, or another hardware processing circuit.

In some examples, each of one or more of the content type determination engine 106, the delimiters determination engine 108, the DSV data parser, and the DSV field names determination engine 112 can be implemented using machine-readable instructions executable on a hardware processor. Machine-readable instructions executable on a hardware processor can refer to the instructions executable on a single hardware processor or the instructions executable on multiple hardware processors.

A storage medium can be used to store the machine-readable instructions. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   determine whether input data comprises binary data or text data; and
   in response to determining that the input data comprises the text data, perform a delimiter identification process comprising:
      identifying candidate record delimiters and candidate field delimiters in the input data;
      providing different pairs of candidate record delimiters and candidate field delimiters, wherein each respective pair of the different pairs comprises a corresponding candidate record delimiter and a corresponding field delimiter,
      for each respective pair of the different pairs:
         identifying records using the corresponding candidate record delimiter of the respective pair, and
         computing a first measure indicating a quantity of unique fields observed in the records identified using the corresponding field delimiter of the respective pair; and
      selecting, based on values of the first measure computed for corresponding pairs of the different pairs, a record delimiter and a field delimiter in a pair of the different pairs.

2. The non-transitory machine-readable storage medium of claim 1, wherein the instructions that upon execution cause a system to:
   perform the delimiter identification process in response to determining that the text data conforms to a delimiter-separated value (DSV) model.

3. The non-transitory machine-readable storage medium of claim 1, wherein the instructions upon execution cause a system to:
   determine a corresponding quantity of fields in each record of the records identified using the corresponding candidate record delimiter of the respective pair, to produce corresponding quantities of fields;
   increment a count for each of the corresponding quantities of fields that is unique; and
   determine the quantity of unique fields based on the incremented count.

4. The non-transitory machine-readable storage medium of claim 1, wherein the delimiter identification process comprises:
   for each respective pair of the different pairs, computing a second measure indicating a degree of variation of field counts specifying quantities of fields in the records identified using the corresponding candidate record delimiter of the respective pair,
   wherein the selecting of the record delimiter and the field delimiter is further based on the second measure.

5. The non-transitory machine-readable storage medium of claim 4, wherein the delimiter identification process comprises:
   disqualifying a first pair of the different pairs responsive to a value of the first measure computed for the first pair exceeding a first threshold.

6. The non-transitory machine-readable storage medium of claim 5, wherein the delimiter identification process comprises:
   disqualifying a second pair of the different pairs responsive to a value of the second measure computed for the second pair exceeding a second threshold.

7. The non-transitory machine-readable storage medium of claim 4, wherein the second measure is based on a sum of difference values divided by a total quantity of records in the input data, wherein each respective difference value of the difference values is based on a difference between a corresponding field count of the field counts and an average of the field counts.

8. The non-transitory machine-readable storage medium of claim 1, wherein the delimiter identification process comprises:
   for each respective pair of the different pairs, computing a second measure indicating how many times a quantity of fields has decreased in successive records of the records identified using the corresponding candidate record delimiter of the respective pair,
   wherein the selecting of the record delimiter and the field delimiter is further based on the second measure.

9. The non-transitory machine-readable storage medium of claim 8, wherein the delimiter identification process comprises:
   disqualifying a first pair of the different pairs responsive to a value of the second measure computed for the first pair exceeding a threshold.

10. The non-transitory machine-readable storage medium of claim 1, wherein the delimiter identification process comprises:
    for each respective pair of the different pairs, determining a frequency of the corresponding candidate record delimiter and the corresponding field delimiter in the input data, to produce corresponding frequencies for the respective pairs,
    wherein the selecting of the record delimiter and the field delimiter is further based on the corresponding frequencies for the respective pairs.

11. The non-transitory machine-readable storage medium of claim 10, wherein the selecting favors a given pair of the different pairs with a higher frequency.

12. The non-transitory machine-readable storage medium of claim 1, wherein the instructions upon execution cause the system to:
    process the input data using the selected record delimiter and the selected field delimiter.

13. A system comprising:
    a hardware processor; and
    a non-transitory storage medium storing instructions executable on the hardware processor to:
       identify candidate record delimiters and candidate field delimiters in input data;
       provide different pairs of candidate record delimiters and candidate field delimiters, wherein each respective pair of the different pairs comprises a corresponding candidate record delimiter and a corresponding field delimiter,
       for each respective pair of the different pairs:
          identify records using the corresponding candidate record delimiter of the respective pair, and
          compute a measure indicating a consistency in a quantity of fields observed in the records identified using the corresponding field delimiter of the respective pair; and
       select, based on values of the measure computed for corresponding pairs of the different pairs, a record delimiter and a field delimiter in a pair of the different pairs.

14. The system of claim 13, wherein the instructions are executable on the hardware processor to:

for each respective pair of the different pairs, determine a frequency of the corresponding candidate record delimiter and the corresponding field delimiter in the input data, to produce corresponding frequencies for the respective pairs, wherein the selecting of the record delimiter and the field delimiter is further based on the corresponding frequencies for the respective pairs.

15. The system of claim 13, wherein the measure indicates a quantity of unique fields observed in the records identified using the corresponding field delimiter of the respective pair.

16. The system of claim 13, wherein the measure indicates a degree of variation of field counts specifying quantities of fields in the records identified using the corresponding candidate record delimiter of the respective pair.

17. The system of claim 13, wherein the measure indicates how many times a quantity of fields has decreased in successive records of the records identified using the corresponding candidate record delimiter of the respective pair.

18. A method comprising:
applying, by a system comprising a hardware processor, a heuristic-based delimiter identification process that comprises:
identifying candidate record delimiters and candidate field delimiters in input data;
providing different pairs of candidate record delimiters and candidate field delimiters, wherein each respective pair of the different pairs comprises a corresponding candidate record delimiter and a corresponding field delimiter,
for each respective pair of the different pairs:
identifying records using the corresponding candidate record delimiter of the respective pair, and
computing a measure indicating a consistency in a quantity of fields observed in the records identified using the corresponding field delimiter of the respective pair; and
selecting, based on values of the measure computed for corresponding pairs of the different pairs, a record delimiter and a field delimiter in a pair of the different pairs.

19. The method of claim 18, wherein the heuristic-based delimiter identification process comprises:
for each respective pair of the different pairs, determining, by the system, a frequency of the corresponding candidate record delimiter and the corresponding field delimiter in the input data, to produce corresponding frequencies for the respective pairs,
wherein the selecting of the record delimiter and the field delimiter is further based on the corresponding frequencies for the respective pairs.

20. The method of claim 18, wherein the measure indicates a quantity of unique fields observed in the records identified using the corresponding field delimiter of the respective pair.

* * * * *